May 21, 1935.  J. E. MITCHELL  2,001,974
COTTON CLEANING AND RECLAIMING MACHINE
Filed May 19, 1933
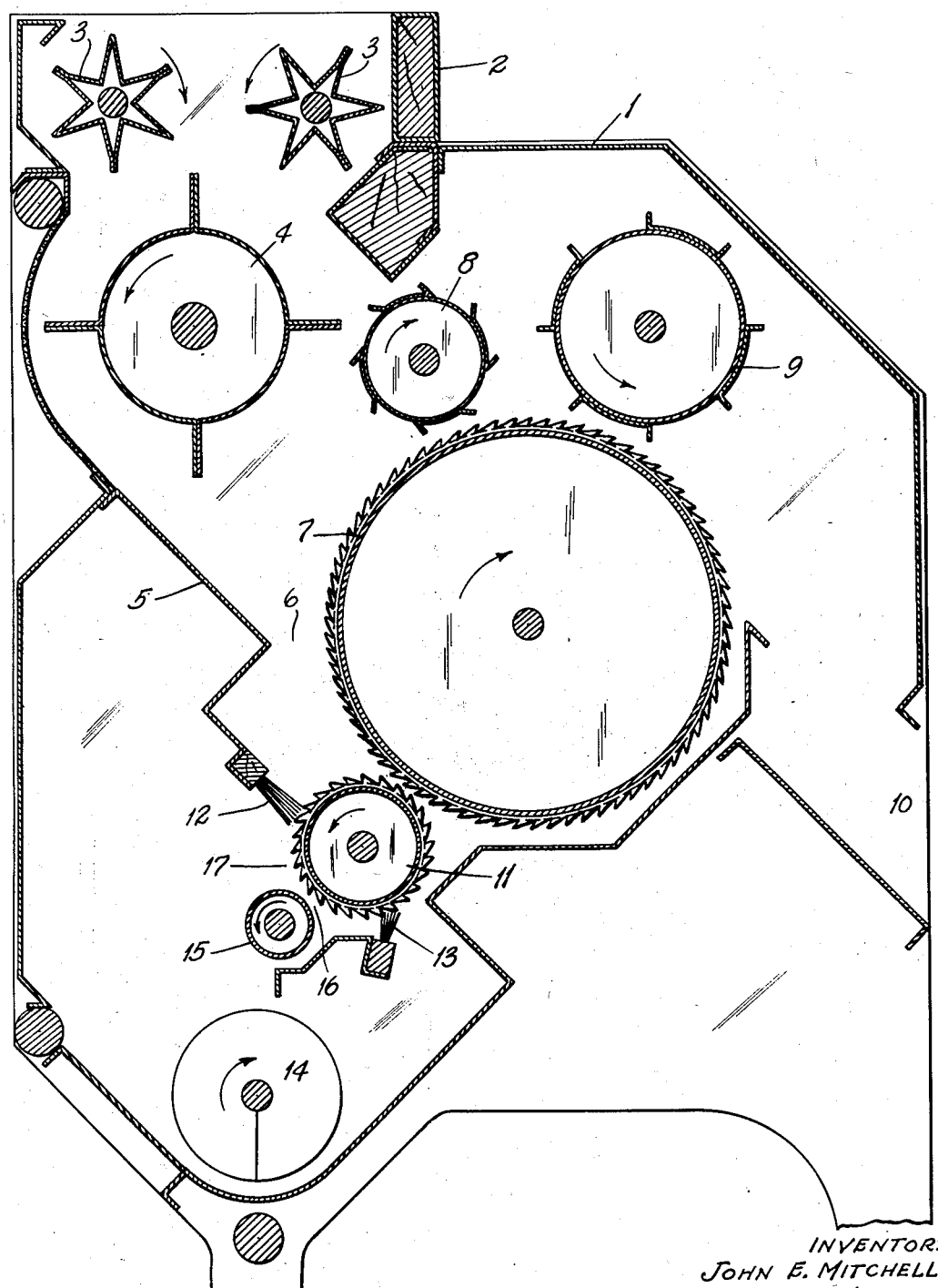
INVENTOR:
JOHN E. MITCHELL.
BY Bruce S. Elliott
ATTORNEY.

Patented May 21, 1935

2,001,974

UNITED STATES PATENT OFFICE 2,001,974

COTTON CLEANING AND RECLAIMING MACHINE

John E. Mitchell, Dallas, Tex.

Application May 19, 1933, Serial No. 671,798

10 Claims. (Cl. 19—37)

This invention relates to certain new and useful improvements in cotton cleaning machinery and has particular reference to the provision of means for facilitating the reclaiming of cotton that would otherwise escape from the machine with the hulls, and at the same time to prevent injury to the saws of the machine by hard objects, such as nails, stones, and the like, which frequently enter the machine along with the cotton.

In the type of machine to which my invention relates, a small reclaiming saw is mounted adjacent to the main saw cylinder and immediately under the discharge opening provided in such machines for the escape of hulls and lock cotton not engaged by the main saw cylinder, and yielding members are arranged to cooperate with the surface of said reclaiming saw cylinder to insure that the locks of cotton falling on the cylinder and being carried by the reclaiming saws under said yielding members will be forced into engagement with the teeth of the saws and thereafter be doffed therefrom by the main saw cylinder; while hulls and other like trash, being too hard to be forced by the yielding members into engagement by the teeth of the reclaiming saw cylinder will be discharged by centrifugal action through the spaces provided between said yielding members. Such a construction is illustrated in my prior Patent, No. 1,613,242, dated January 4, 1927.

It has been found, however, that discharge openings of uniform size are unsatisfactory, especially as applies to the opening following the first or uppermost yielding member, indicated by the numeral 13 in the drawing of said patent, for the reason that in the early part of the ginning season when the cotton is relatively clean, it permits too many locks to be discharged through the opening, while in the latter part of the season, when the cotton is of somewhat poorer quality and contains a much larger percent of hulls, the opening if arranged to prevent the escape of cotton will not permit a sufficiently free discharge of the hulls. Moreover, in the latter part of the ginning season, when the cotton is less valuable, escape of a small proportion of the lock cotton is comparatively of no consequence.

In a companion application I have described and claimed adjustable means for providing a discharge opening following the first yielding member, which permits such opening to be decreased in size when cotton comparatively free from hulls is being cleaned, and which may be adjusted to increase the size of said opening to permit a free discharge of the hulls when cotton containing a large percentage of hulls and trash is being cleaned.

In certain sections of the country, where cotton is harvested mechanically, by dragging or sledding machines, not only does the cotton contain a high percentage of hulls, twigs and other trash, but it also frequently contains stones, pieces of wood and iron and other hard substances, either scraped from the ground or broken off of the machine in the course of operation. If such hard articles should fall into the gap between the adjustable member and the reclaiming saw of the type of machine illustrated in my companion application more or less serious damage would result to the teeth of the reclaiming saw cylinder, and it is to obviate, as far as possible, such an occurrence when the machine is used for cleaning cotton liable to contain pieces of rock, or other hard articles, that the present arrangement has been devised.

According to this invention, I substitute a small smooth roller for either type of adjustable member shown in my application, which roller is rotated at a relatively high rate of speed, and, as to its upper portion, in a direction away from the reclaiming saw cylinder, so that large hulls and hard articles will be carried away from the reclaiming saw cylinder by a frictional engagement with the surface of the roller, and there will practically be no tendency for pieces of rock, stones, or the like, to become wedged in the gap between the roller and the reclaiming saw cylinder. At the same time, the roller is positioned sufficiently close to the surface of the reclaiming saw cylinder to provide a narrow gap through which cotton engaged by the teeth of the reclaiming saws can readily be carried, together with small pieces of hulls and other small trash which may be carried along with the cotton.

The invention is illustrated in the accompanying drawing, in which the figure is a longitudinal sectional view through a machine constructed according to my invention.

Referring now to the drawing, the numeral 1 indicates the casing of the machine, having a projecting portion, 2, on its top affording an opening for receiving the bulk cotton, and in the opening of which projection are located feed rollers, 3. Positioned below the feed roller is a beater or distributing roller, 4, cooperating with an inclined hull board, 5, the lower end of which defines the size of a discharge opening, 6, past the main saw cylinder, 7. Cooperating with the upper portion of the saw cylinder is a kicker roll, 8, and a doffer, 9, the doffed cotton being discharged through an opening, 10, into the gin, on which the machine is mounted. Rotatably mounted below the discharge opening 6, and adjacent to the lower side of the saw cylinder 7, is a small reclaiming saw cylinder, 11, cooperating with which are two yielding members, in the form of rows of brushes, 12, 13, respectively, said yielding members extending throughout the length of the reclaiming saw cylinder. In the lower part of the casing is arranged a screw conveyor, 14, for discharging refuse from the casing of the machine. The parts indicated are all of conventional design, and the direction of rotation of the various rotatable members are indicated by arrows placed thereon.

Dealing now with the improvement constituting the subject matter of the present invention, the numeral 15 indicates a smooth roller which is located at the lower side of the reclaiming saw cylinder 11, that is to say, its axis is well below the axis of the reclaiming saw cylinder. This roller is designed to be rotated in the direction indicated by the arrows at a relatively high rate of speed, and is positioned sufficiently close to the surface of the reclaiming saw cylinder to provide a narrow gap, 16, through which cotton may be drawn by the reclaiming saws. As shown, the roller 15, is of much less diameter than the reclaiming saw cylinder, so that the arcs of these two members defining the narrow space between them diverge greatly from each other in opposite directions, so that any hard substance falling on the roller would have to be very small before there would be any tendency for the saw teeth to drag or force it into the space 16, against the frictional resistance of the roller rotating at a higher rate of speed in the opposite direction; whereas, if the roller were too large in diameter, the peripheral arcs defining the size of gap 16, would be such as to greatly increase the tendency for hard substances to be caught or wedged in such gap by the downward movement of the saws into said gap, although the friction due to the rotation of the smooth roller in the opposite direction would tend to overcome this tendency. But with the proper relative dimensions of the roller and reclaiming saw cylinder, and the proper spacing between the two, I find that any tendency for hard articles to be caught between the roller and reclaiming saw cylinder, or to cause damage to the saw teeth of the latter is entirely overcome.

In the present case the smooth roller 15 provides with the yielding member 12 a discharge opening, 17, which is of fixed size; and if the roller 15 were a stationary member, the disadvantages incident to a discharge opening of fixed size would obtain; but such disadvantages are overcome by the rotation of the roller in a direction away from the reclaiming saw cylinder, as to its upper portion, as will appear from the following description of the operation.

Bulk cotton passing down the hull board 5, is engaged by the saw cylinder 7, as usual. The hulls sliding down the hull board, and those knocked back by the kicker roll 8, together with lock cotton not engaged by the teeth of the saws, pass through the opening 6, and fall on the reclaiming saw cylinder 11. They are then carried under the yielding member 12, which causes the locks of cotton to be engaged by the teeth of the reclaiming saws, while the hulls, being hard, are not so engaged and are thrown out through the opening 17. The lock cotton is carried around through the gap 16, under the yielding member 13, which further insures their engagement by the teeth of the reclaiming saws, and are doffed from the latter by the main saw cylinder. The small roller 15, being substantially smooth, has very little if any tendency to doff or pull cotton off of the teeth of the reclaiming saws, even if the teeth of the reclaiming saws only engage a single fiber or strand of the cotton. Thus very little waste of cotton occurs even during the early part of the ginning season when there are comparatively few hulls to contend with. During the latter part of the ginning season when the proportion of hulls and trash is greatly increased, a certain proportion thereof will fall on the roller 15. But due to the rapid rotation of this roller in a direction away from the teeth of the saw cylinder the quick removal of such hulls and trash is effected, and, for the same reason, any hard articles will be carried away from the reclaiming saw cylinder and prevented from wedging into the narrow gap 16.

From the above description it will be seen that a double discharge of hulls and trash is provided by the present arrangement, viz: That effected by centrifugal action, causing discharge through the opening 17, and that effected by frictional engagement of the hulls with the roller 15, which, as explained, operates by friction to carry the hulls away from the reclaiming saw cylinder. In this way I am enabled to provide a discharge opening 17, sufficiently small to prevent waste of cotton during the early part of the ginning season and, in cooperation with the rapidly rotating roller 15, large enough to insure a free discharge of all hulls falling on the reclaiming saw cylinder.

I wish it also understood that the combination, in its broad aspects, is not limited to doffing the cotton from the reclaiming saws by the main saw cylinder. I may use a separate doffing cylinder for this purpose, as shown in my patent referred to, or I may employ any other preferred means, or arrangement for doffing the cotton from the reclaiming saw cylinder.

I claim:

1. In a machine of the class described, in combination with a main saw cylinder, a reclaiming saw cylinder positioned to receive hulls and cotton escaping past the main saw cylinder, a smooth roller of less diameter than the reclaiming saw cylinder and rotating, as to its upper portion, in a direction away from said reclaiming saw cylinder, whereby it is adapted to engage foreign matter and carry it away from the gap between said roller and the reclaiming saw, said roller defining the size of a narrow gap past the reclaiming saw cylinder for the passage of cotton engaged by the teeth of the reclaiming saws, and means for doffing cotton from said reclaiming saw cylinder.

2. In a machine of the class described, in combination with a main saw cylinder, a reclaiming saw cylinder mounted in doffing relation thereto, and a smooth roller of less diameter than the reclaiming saw cylinder and rotating as to its upper portion in a direction away from the reclaiming saw cylinder, whereby it is adapted to engage foreign matter and carry it away from the gap between said roller and the reclaiming saw, said roller defining the size of a narrow gap between itself and the reclaiming saw cylinder for the passage of cotton engaged by the teeth of the reclaiming saws.

3. In a machine of the class described, in combination with a main saw cylinder, a reclaiming saw cylinder positioned to receive hulls and cotton escaping past the main saw cylinder, a smooth roller of less diameter than the reclaiming saw cylinder and rotating, as to its upper portion, in a direction away from said reclaiming saw cylinder, and at a higher rate of speed, whereby it is adapted to engage foreign matter and carry it away from the gap between said roller and the reclaiming saw, said roller defining the size of a narrow gap between itself and the reclaiming saw cylinder for the passage of cotton engaged by the teeth of the reclaiming saws, and means for doffing cotton from the reclaiming saw cylinder.

4. In a machine of the class described, in combination with a main saw cylinder, a reclaiming saw cylinder of less diameter than the main saw cylinder and positioned to receive hulls and cotton escaping past the main saw cylinder, a smooth roller of less diameter than the reclaiming saw cylinder and rotating, as to its upper portion, in a direction away from the reclaiming saw cylinder and at a higher rate of speed, whereby it is adapted to engage foreign matter and carry it away from the gap between said roller and the reclaiming saw, said roller defining the size of a narrow gap between itself and the reclaiming saw cylinder for the passage of cotton engaged by the teeth of the reclaiming saws, and means for doffing cotton from said saw cylinder.

5. In a machine of the class described, in combination with a main saw cylinder, a reclaiming saw cylinder of less diameter than the main saw cylinder and positioned to receive hulls and cotton escaping past the main saw cylinder and mounted in doffing relation to said cylinder, and a smooth roller of less diameter than the reclaiming saw cylinder and rotating, as to its upper portion, in a direction away from said reclaiming saw cylinder and at a higher rate of speed, whereby it is adapted to engage foreign matter and carry it away from the gap between said roller and the reclaiming saw, said roller defining the size of a narrow gap between itself and the reclaiming saw cylinder for the passage of cotton engaged by the teeth of the reclaiming saws.

6. In a machine of the class described, in combination with a main saw cylinder rotating, as to one side, in an upward direction, a reclaiming saw cylinder mounted in proximity to the main saw cylinder at said side and positioned to receive hulls and cotton escaping past said main saw cylinder, said reclaiming saw cylinder rotating, as to the side opposed to said main saw cylinder, in an upward direction, a smooth roller mounted in spaced parallel relation to the reclaiming saw cylinder with its axis below the axis of the latter and defining the size of a narrow gap past the reclaiming saw cylinder for the passage of cotton engaged by the teeth of the latter, said roller being of less diameter than the reclaiming saw cylinder and rotating at a higher rate of speed, and, as to its upper side, in a direction away from the reclaiming saw cylinder, whereby it is adapted to engage foreign matter and carry it away from the gap between said roller and the reclaiming saw and means for doffing cotton from said reclaiming saw cylinder.

7. In a machine of the class described having a main saw cylinder and providing a discharge opening past said cylinder for hulls, and cotton not engaged by the saws of said cylinder, a reclaiming saw cylinder mounted below said opening, a yielding member cooperating with the surface of said reclaiming saw cylinder, and a roller located beyond said yielding member and providing with said member an opening for the discharge of hulls thrown off by the reclaiming saw cylinder, said roller defining the size of a narrow gap between itself and the reclaiming saw cylinder for the passage of cotton engaged by the teeth of the reclaiming saws, and being of less diameter, and rotating as to its upper side in a direction away from the reclaiming saw cylinder, whereby it is adapted to engage foreign matter and carry it away from the gap between said roller and the reclaiming saw and means for doffing cotton from said reclaiming saw cylinder.

8. In a machine of the class described having a main saw cylinder and providing a discharge opening past said cylinder for hulls, and cotton not engaged by the saws of said cylinder, a reclaiming saw cylinder mounted below said opening, a yielding member cooperating with the surface of said reclaiming saw cylinder, and a roller located beyond said yielding member and providing with said member an opening for the discharge of hulls thrown off by the reclaiming saw cylinder, said roller defining the size of a narrow gap between itself and the reclaiming saw cylinder for the passage of cotton engaged by the teeth of the reclaiming saws, and being of less diameter, and rotating at a higher rate of speed than, the reclaiming saw cylinder and, as to its upper side, in a direction away from the reclaiming saw cylinder, whereby it is adapted to engage foreign matter and carry it away from the gap between said roller and the reclaiming saw and means for doffing cotton from said reclaiming saw cylinder.

9. In a machine of the class described having a main saw cylinder and providing an opening past the same for the discharge of hulls, and lock cotton not engaged by the saws of the cylinder, a reclaiming saw cylinder located below said opening, yielding members cooperating with the surface of said reclaiming saw cylinder at points removed from each other on its periphery, a smooth roller of less diameter than the reclaiming saw cylinder and rotating as to its upper side, in a direction away from the reclaiming saw cylinder, whereby it is adapted to engage foreign matter and carry it away from the gap between said roller and the reclaiming saw, said roller being positioned between said yielding members and defining the size of a narrow gap between itself and the reclaiming saw cylinder for the passage of cotton engaged by the teeth of the reclaiming saws, and providing with one of said yielding members a discharge space for hulls thrown off by the reclaiming saw cylinder, and means for doffing cotton from the reclaiming saw cylinder.

10. In a machine of the class described having a main saw cylinder and providing an opening past the same for the discharge of hulls, and lock cotton not engaged by the saws of the cylinder, a reclaiming saw cylinder located below said opening, yielding members cooperating with the surface of said reclaiming saw cylinder at points removed from each other on its periphery, a smooth roller of less diameter than the reclaiming saw cylinder and rotating at a higher rate of speed and, as to its upper side, in a direction away from the reclaiming saw cylinder, whereby it is adapted to engage foreign matter and carry it away from the gap between said roller and the reclaiming saw, said roller being positioned between said yielding members and defining the size of a narrow gap between itself and the reclaiming saw cylinder for the passage of cotton engaged by the teeth of the reclaiming saws, and providing with one of said yielding members a discharge space for hulls thrown off by the reclaiming saw cylinder, and means for doffing cotton from the reclaiming saw cylinder.

JOHN E. MITCHELL.